Figure 2:
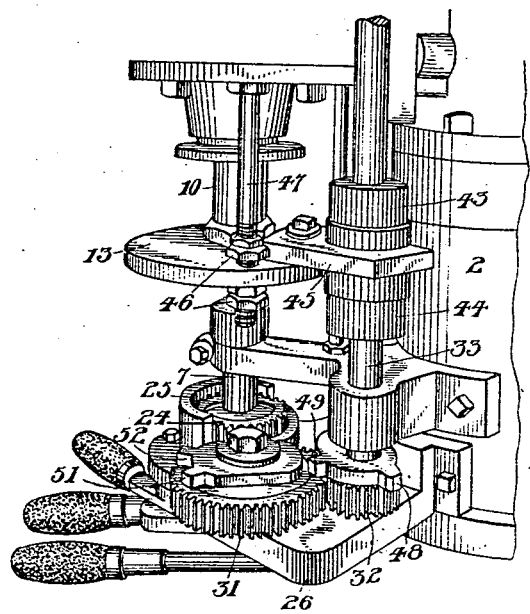

No. 857,803. PATENTED JUNE 25, 1907.
G. W. HENNING & A. W. BEESON.
GLASS PRESSING AND BLOWING MACHINE.
APPLICATION FILED JUNE 16, 1906.

4 SHEETS—SHEET 1.

No. 857,803. PATENTED JUNE 25, 1907.
G. W. HENNING & A. W. BEESON.
GLASS PRESSING AND BLOWING MACHINE.
APPLICATION FILED JUNE 16, 1906.

4 SHEETS—SHEET 2.

Witnesses:

Inventors
George W. Henning
Arthur W. Beeson
By Kay Totten & White
Attorneys

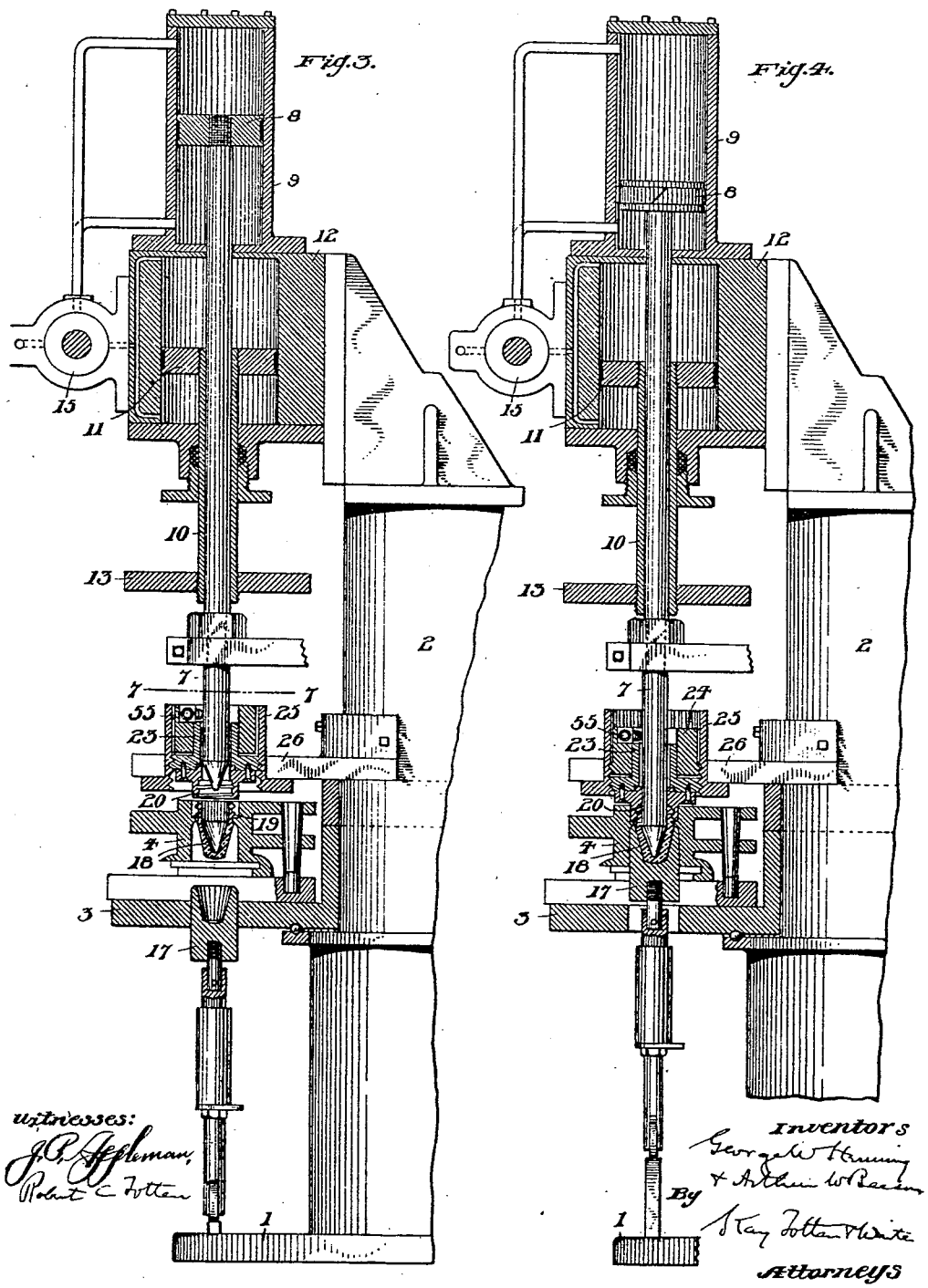

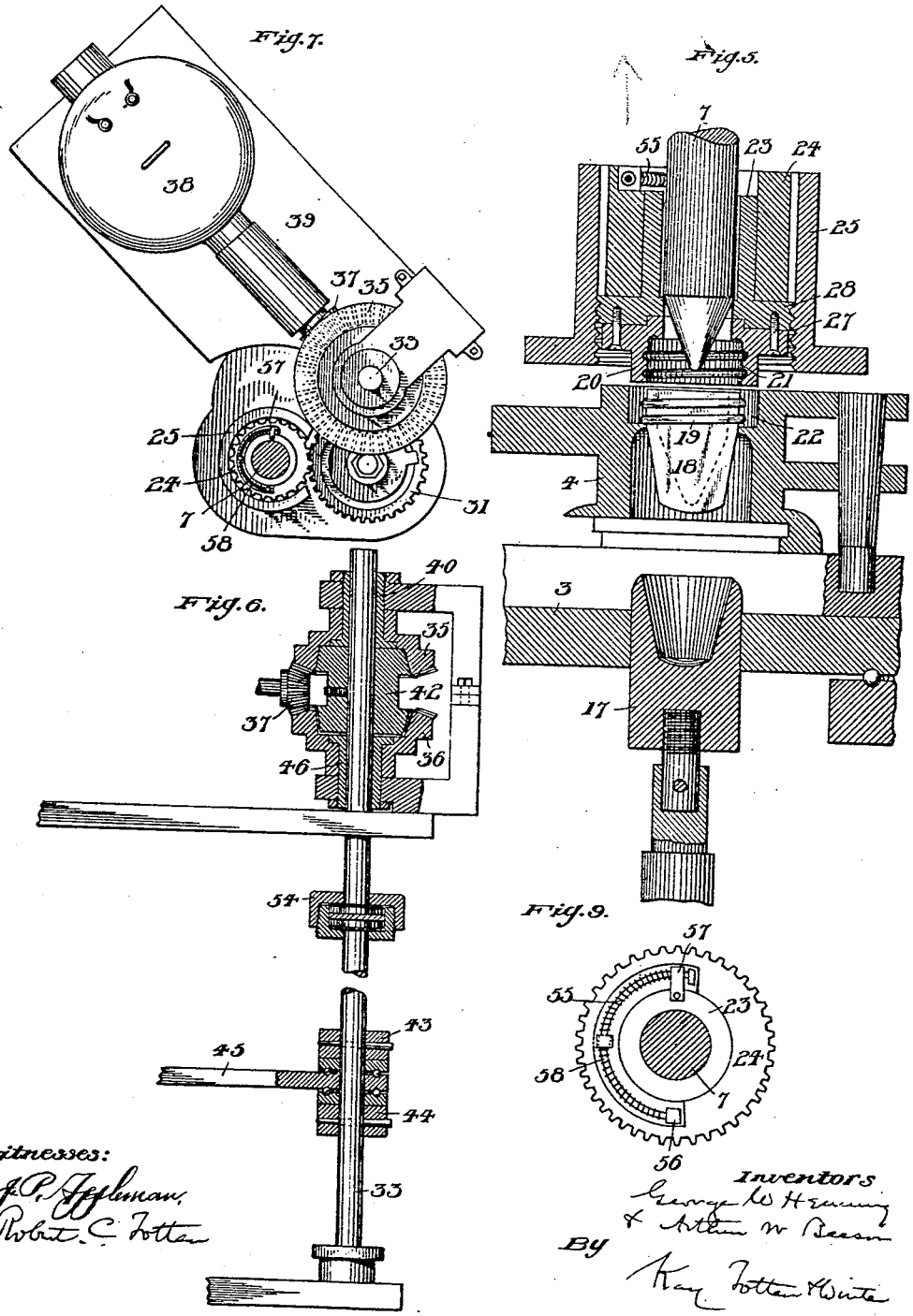

UNITED STATES PATENT OFFICE.

GEORGE W. HENNING AND ARTHUR W. BEESON, OF WASHINGTON, PENNSYLVANIA.

GLASS PRESSING AND BLOWING MACHINE.

No. 857,803.  Specification of Letters Patent.  Patented June 25, 1907.

Application filed June 16, 1906. Serial No. 321,999.

*To all whom it may concern:*

Be it known that we, GEORGE W. HENNING and ARTHUR W. BEESON, residents of Washington, in the county of Washington and State of Pennsylvania, have invented a new and useful Improvement in Glass Pressing and Blowing Machines; and we do hereby declare the following to be a full, clear, and exact description thereof.

This invention relates to glass molding machines and more particularly to molding and blowing machines for forming bottles, jars and the like provided with necks having external screw threads.

The object of the invention is to provide mechanism which may be readily adapted and attached to any form of molding and blowing machines, and which operates automatically and whereby a thread or threads without fin or seam may be formed on the article.

Certain bottles, jars and other articles of glass or other plastic material are provided with an external thread or threads on their necks for the purpose of receiving a suitable threaded closure. Heretofore such threads have been formed either by means of a partible threaded ring or mold, or by a continuous or seamless ring or mold. In the former case the parting of the mold leaves a slight fin or projection on the thread which is objectionable. The seamless or continuous ring mold is not open to this objection, but up to the present time it was necessary to remove the same from the molded article by hand, thus rendering the operation slow and expensive.

Our invention provides automatically operating mechanism for removing a seamless or continuous ring mold so that the thread or threads formed on the article will be without the objectionable fin or seam and the manufacture nevertheless be expeditious and cheap.

To the accomplishment of the foregoing object the invention comprises the combination of parts hereinafter described and claimed.

In the drawings the invention is shown applied to one standard form of bottle molding and blowing machine, known as the "blue" machine, which, however, has been selected merely for purposes of illustration, and it will be understood that our invention is applicable to any form of glass molding and blowing machine, and even to a glass molding machine which does not embody any blowing feature. We wish it understood therefore that no limitations upon the terms of the claims as herein made are to be implied either from the illustration or description of the specific machine shown.

While we will describe the invention particularly with reference to the formation of glass bottles or jars, it will be understood that the invention is not limited thereto but is applicable to any plastic molding apparatus whether for working on glass or other plastic material, or for forming articles other than bottles or jars, and even articles other than hollow ones.

Figure 8:
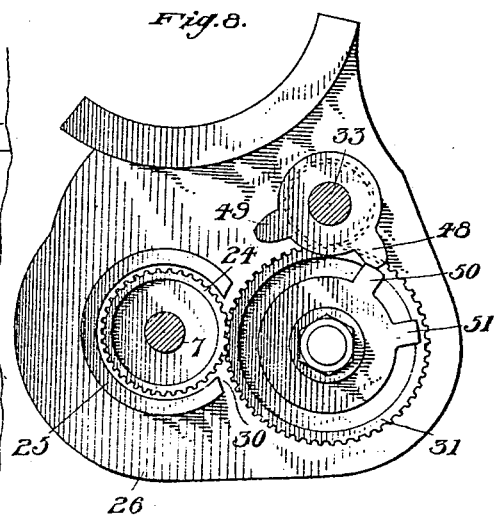
Figure 10:
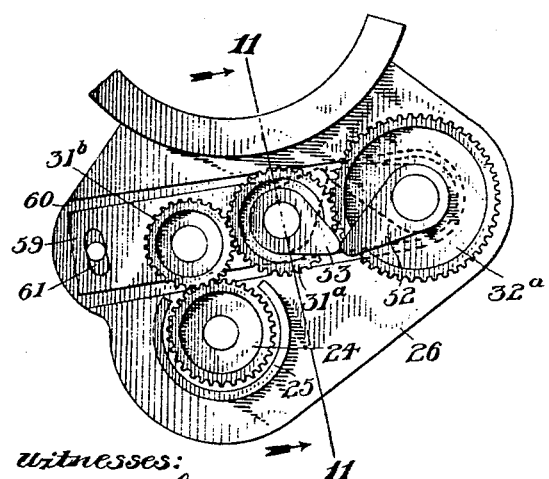
Figure 11:
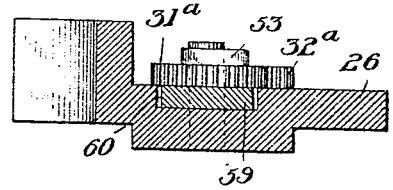

In the accompanying drawing Figure 1 is a perspective view showing our invention applied to a "blue" bottle molding and blowing machine; Fig. 2 is a similar view of a portion thereof showing the parts on an enlarged scale; Fig. 3 is a vertical section taken through the pressing plunger of the "blue" machine with our invention applied thereto, showing the parts in one position; Fig. 4 is a similar view showing the parts in another position; Fig. 5 is a similar view showing the mold and ring on an enlarged scale; Fig. 6 is a vertical section through the main vertical shaft of our attachment; Fig. 7 is in part a top plan view and in part a horizontal section on the line 7—7, Fig. 3; Fig. 8 is horizontal section on the line 8—8, Fig. 1; Fig. 9 is plan on an enlarged scale of the ring gear; Fig. 10 is a view similar to Fig. 8 showing a modification; and Fig. 11 is a vertical section on the line 11—11, Fig. 10.

The machine selected for purposes of illustrating our improvement is one type of the "Blue" bottle molding and blowing machine, this comprising a suitable base or support 1 carrying a central standard 2 around which is the revolving table 3. This table carries a series of molds 4, usually five, three such molds being shown in Fig. 1 and each being of a well known partible type. The table is also provided with suitable indexing mechanism, not shown, and is operated in the usual manner of operating these tables. The standard 2 carries the pressing and blowing apparatus, the latter being shown at 6, while the presser or plunger 7 is connected to a piston 8 working in a double acting power cylinder 9. Surrounding the upper portion of the plunger 7 is a hollow piston rod 10 connected to a piston 11 working in the double acting power cylinder 12, this hollow piston rod carrying the usual top spring plate 13 for actuating the follower ring of glass molding machines. The cylinders 9 and 12 are controlled by a suitable valve 15 connecting said cylinders to a source of fluid pressure, such as compressed air, and so arranged as to admit the air first into the top of the cylinder 12, then into the top of the cylinder 9, then into the bottom of the cylinder 9 and then into the bottom of the cylinder 12, so as to first depress the ring follower, then depress the plunger 7, then raise the plunger 7, and then raise the ring follower, all as is well understood by those skilled in this art. With our improvement, however, the ring follower is dispensed with, but the spring plate 13 is used for another purpose hereinafter described. Inasmuch as valves suitable for performing the several functions above enumerated, are old, and especially as a large variety of valve mechanisms may be adapted for this purpose, we have not deemed it necessary to either illustrate or describe the valve 15 in detail. The molds 4 will be provided with the usual appurtenances characteristic of this type of machine, but as they form no part of this invention a description thereof is unnecessary.

The parts of the machine so far described are all old, and inasmuch as they form no part of the present invention they have not been shown nor described in detail, and the operation of the machine is well understood by those skilled in the art.

Inasmuch as our invention is applied only at the point of pressing, and has nothing to do with the blowing features of the machine, and especially as it is applicable to molding machines having no blowing feature, the illustration of the type of machine has been limited largely to the pressing portion thereof.

Figs. 3, 4 and 5 show the mold 4 provided with the lower follower 17 for shaping the molten glass during the pressing operation, and the plunger 7 has its lower end shaped, as shown, so as to press the body of glass down into the follower to form the pressed glass article 18 having a neck provided with threads 19. The special object of our invention is to screw or unscrew the thread forming mold into and out of mold 4 by automatically operating mechanism. This is accomplished by providing a seamless or continuous ring mold 20 having internal threads 21 and adapted to seat in a depression 22 in the mold 4 when receiving the gathering of glass. This ring mold is formed either integral with or is secured to an upwardly projecting sleeve member 23 which has either integral therewith or attached thereto a long gear or pinion 24. The ring mold and gear are surrounded by a bearing member 25 carried by a plate 26 secured to the column 2.

The bearing member 25 at its lower part is provided with screw threads 27 engaging similar threads 28 on the sleeve member 23, these threads being of the same pitch as the threads 21 in the ring mold 20.

The ring mold 20 is rotated and lifted automatically by the following mechanism: The bearing 25 is cut away on one side, as at 30. Through this portion projects a gear 31, journaled in the plate 26, meshing with the gear 24 on the sleeve member. The gear 31 in turn meshes with a pinion 32 on the lower end of a vertical shaft 33. Loosely surrounding the upper end of this shaft are two beveled gears 35 and 36 facing oppositely and both in constant mesh with a beveled pinion 37 on the armature shaft of a motor 38 which is mounted on a plate 39 secured to the upper part of the column 2. Any other source of power may be utilized. The pinion 37 is preferably constantly in mesh with the two gears 35 and 36 as thereby shocks in reversing the shaft 33 are avoided. The motor runs constantly and the gears 35 and 36 rotate constantly in opposite directions. Said gears are journaled on sleeve bearings 40 surrounding the shaft 33 and so formed as to hold said gears accurately in position and in mesh with the pinion 37. The gears 35 and 36 on their meeting sides are recessed and located therebetween and secured to the shaft 33 is a double faced clutch member 42 arranged to engage either of the gears, but not both at the same time. This clutch member 42 is brought into contact with one or the other of the gears 35 and 36 by raising and lowering the shaft 33. This is accomplished by providing said shaft with collars 43 and 44 between which is the forked end of an arm 45 secured to the spring plate 13 of the machine. With our invention the usual ring follower is dispensed with, its function being performed by the ring die 20. Consequently the spring plate 13 is available for the attachment of the arm 45. It is obvious when the spring plate 13 is raised or lowered by means of the piston 11 the shaft 33 is similarly raised or lowered to bring the clutch member 42 into engagement with one or the other of the gears 35 and 36 thereby changing the direction of rotation of the shaft 33, and through the gears 31 and 23 rotating the ring 20 in opposite directions. The extent of travel of the spring plate is limited by stop nuts 46 on bolts 47 depending from the cylinder mounting.

It is necessary that the ring 20 be not screwed down too far, otherwise it will jam against the mold and be difficult of starting in the reverse direction when necessary. We therefore provide stop mechanism which brings the parts to rest before the ring is forced tightly against the mold. This stop mechanism may be of many forms. In Figs. 1 to 9 it is shown as suitable stop teeth 48, 49,

50 and 51 formed on collars secured to or integral with the gears 31 and 32. These teeth are so positioned with reference to the gears that when, for instance, the tooth 48 comes into contact with the tooth 50, the downward rotation of the ring is arrested, and vice versa when rotating in the opposite direction the tooth 49 comes into contact with the tooth 51 the upward movement of the ring is arrested. In Figs. 10 and 11 another form of stop mechanism is shown, this comprising the members 52 and 53 which will contact in different directions, as shown in full and dotted lines. To compensate for the stop mechanism the train of gearing is provided with a suitable yielding element, shown as an ordinary friction connecting member 54 in the shaft 33, the latter being formed in two sections. Obviously any other form of yielding mechanism, such as a magnetic or electric clutch, would answer the purpose equally as well. As a further guard against jamming the ring 20 against the mold 4 it is connected to the gear 24 by a yielding element shown in Fig. 9 as a light spring 55 located in a recess in the gear and interposed between a stop 56 on the gear and an arm 57 on the sleeve. This spring surrounds a suitable guide rod 58. As a result even if the stop mechanism described does not stop the ring at just the right point this spring yields and prevents jamming.

When the invention is applied to a press having only a single mold the ring member 20 will be carried directly by the table, but with a machine of the character described having a series of molds, and in which only a single ring member is provided for the series, this ring member is carried by the supporting plate 26 secured to the column 2 or other convenient stationary part of the machine. This plate 26, as shown, carries the bearing member 25 for the gear 24. The gear 24 with the ring 20 is prevented from falling out by the engagement of the threads 27 and 28.

The operation of the mechanism is as follows: The general operation of the machine is the same as heretofore, the glass being cut into a closed mold, the latter brought under the presser or plunger 7, the valve 15 manipulated in the usual manner to first bring down the spring plate 13, then bring down the plunger 7, then raise the plunger, and then elevate the spring plate, the table then being rotated to bring the mold underneath the blowing apparatus and to bring a newly filled mold underneath the presser, this operation continuing intermittently as is the usual practice.

With our improvement the old manipulation is followed without variation. The usual ring follower carried by the spring plate 13 is dispensed with, but the spring plate is retained. When the filled mold is brought underneath the plunger 7 the valve 15 is manipulated in the usual way, first moving the spring plate 13 downwardly, thus bringing the clutch member 42 in contact with the gear 36. The motor is rotating constantly and in such a direction that when the clutch member engages the gear 36, the latter through the shaft 33 and gears 32, 31 and 24 rotates the ring 20 in a direction so that the engaging screw threads 27 and 28 carry the same downwardly to cover the neck of the mold. This rotation continues until the stop teeth, say the teeth 48 and 50, come into contact, thus arresting further rotation of the ring mold. The valve 15 is then given the next usual position so as to force the plunger 7 down through the opening in the ring 20 and into the mold, pressing the glass to the shape shown and forcing it to flow upwardly to form the neck with the threads 19. The valve 15 is then given its next usual position so as to withdraw the plunger 7, and is then immediately moved to the next usual position which raises the spring plate 13 thereby through the arm 45 raising the shaft 33 and bringing the clutch member 42 into engagement with the gear 35 and through the latter and the train of gearing described rotating the gear 24 in the opposite direction, which by means of the interengaging threads 27 and 28 elevates the ring 20 and simultaneously rotates the same so as to screw it off the threaded neck of the article. The mold is then moved to the next station for further operation while a freshly filled mold is brought underneath the plunger 7 and the foregoing operations repeated.

In the operation of the machine with our invention applied thereto the operator performs exactly the same and no further movements than with the old type of machine, merely indexing the table around from time to time and moving the valve 15 to its four positions in succession, this movement securing all of the necessary movements of the pressing mechanism, and also effecting automatic rotation and raising and lowering of the threaded ring mold.

Our mechanism, it will be observed, is entirely automatic and by means of it a thread without fin or seam is formed.

In case the article to be formed is not to be blown the blowing attachment can of course be omitted without in any manner affecting our invention, the latter pertaining exclusively to the pressing or molding feature of the apparatus.

The invention is equally as well applicable to the formation of articles of plastic material other than glass and the claims are intended to cover the molding of any form of plastic material. Our invention is in the form of an attachment which can be readily applied to any existing machine. For instance with the "Blue" machine it is merely necessary to detach from the spring plate 13 the usual follower ring, and then apply to the machine the shaft 33 with its bearings and driving mechanism connecting the arm 45 to the spring plate 13, and replace the usual follower ring by the supporting plate 26 carrying the ring mold 20, gear 24 and its bearings 25 and intermediate gear 31. The invention can be applied with equal facility to any other type of pressing or molding machine. If desired the ring mold and its bearing member 25 may be movable bodily vertically so that the downward screwing of said ring mold can be effected while shifting the dies, the whole then being lowered into the mold. Such arrangement would effect a slight saving of time.

We are aware that it is old to provide machines for forming internal threads on glass articles, such as insulators, with automatic mechanism for rotating and removing the threaded plunger. All such mechanisms, however, are different from ours as they do not involve the rotation of an annular ring-form mold.

What we claim is:

1. Molding apparatus comprising in combination an internally threaded ring mold, a presser, presser actuating mechanism, and automatic mechanism for rotating the ring and simultaneously lifting the same.

2. Molding apparatus comprising in combination an internally threaded ring mold, a presser, presser actuating mechanism, and automatic mechanism for rotating the ring mold alternately in opposite directions.

3. Molding apparatus comprising in combination a mold, a rotatable internally threaded ring, a presser, presser actuating mechanism, and automatic mechanism for rotating the ring alternately in opposite directions and simultaneously raising or lowering the same.

4. Molding apparatus comprising in combination an internally threaded ring mold, a presser, presser reciprocating mechanism, and mechanism operated from the presser reciprocating mechanism for rotating the ring.

5. Molding apparatus comprising in combination an internally threaded ring mold, a presser, presser actuating mechanism, a controller for the presser actuating mechanism, and mechanism operated from said controller for rotating the ring mold.

6. Molding apparatus comprising in combination an internally threaded ring mold, a presser, presser actuating mechanism, ring rotating mechanism, and a hand operated controller arranged to render said mechanisms active successively.

7. Molding apparatus comprising in combination an internally threaded ring mold, ring rotating mechanism and ring lifting mechanism operating simultaneously.

8. Molding apparatus comprising in combination an internally threaded ring mold, a presser, presser actuating mechanism, ring rotating mechanism and ring lifting means operating simultaneously.

9. Molding apparatus comprising in combination an internally threaded ring mold, a co-operating presser, and ring rotating and lifting mechanism arranged to move said mold in proportion to the pitch of the threads in the mold.

10. Molding apparatus comprising in combination an internally threaded ring mold, a co-operating presser, and ring rotating and lifting mechanism including a stationary support having an engagement with the ring by means corresponding to the pitch of the threads in the molds.

11. Molding apparatus comprising in combination an internally threaded ring mold, a co-operating presser, automatic mechanism for rotating the mold, and a stationary support having engagement with the ring by means of threads of the same pitch as those of the mold.

12. Molding mechanism comprising in combination an internally threaded ring mold provided with external threads of the same pitch as the internal threads, a threaded bearing member surrounding the mold and engaging the threads thereof, and mechanism for rotating said mold.

13. Molding apparatus comprising in combination an internally threaded ring mold provided with external threads of the same pitch as the internal threads, a threaded bearing surrounding said mold and engaging the external threads thereon, a gear on said mold, mechanism for engaging the gear and rotating the same, and a co-operating presser.

14. Molding mechanism comprising in combination an internally threaded ring mold, a co-operating presser, and automatic ring rotating mechanism, including stop mechanism for controlling the same.

15. Molding apparatus comprising in combination an internally threaded ring mold, a co-operating presser, automatic mechanism for rotating said mold, stop mechanism included in said mechanism, and a yielding connection between the mold and its rotating mechanism.

16. Molding apparatus comprising in combination an internally threaded ring mold, a co-operating presser, mechanism for rotating the mold comprising a source of power, stop mechanism in the train from the source of power to the mold, and a yielding element in the train between the source of power and stop mechanism.

17. Molding apparatus comprising in combination an internally threaded ring mold, a co-operating presser, a pair of cylinders, one thereof connected to the presser, ring rotating mechanism controlled from the other cylinder, and valve mechanism for rendering said cylinders active successively.

18. Molding apparatus comprising in combination an internally threaded mold, a coöperating presser, mechanism for rotating said mold, presser actuating mechanism, and mechanism operating alternately with the presser mechanism and arranged to reverse the ring rotating mechanism.

19. Molding apparatus comprising in combination an internally threaded ring mold, reversible rotating mechanism thereof, a coöperating presser, power means for actuating the presser and reversing the ring rotating mechanism, and a controller for rendering said mechanisms active in succession.

In testimony whereof, we the said GEORGE W. HENNING and ARTHUR W. BEESON have hereunto set our hands.

GEORGE W. HENNING.
ARTHUR W. BEESON.

Witnesses:
WARREN E. KILGORE,
J. L. HENNING.